Nov. 1, 1966 J. S. SPRAGUE 3,282,308
STUD CUTTING ADAPTER
Filed Nov. 3, 1964
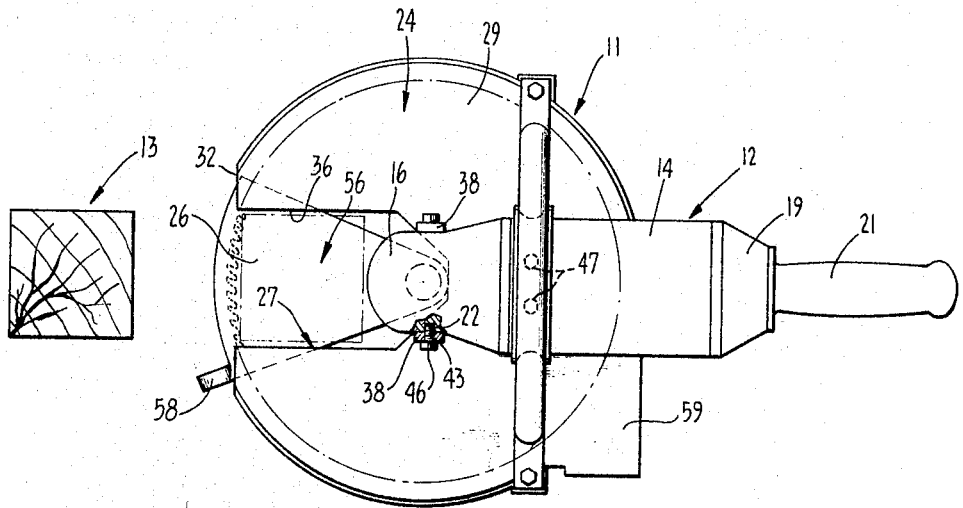
Fig. 1
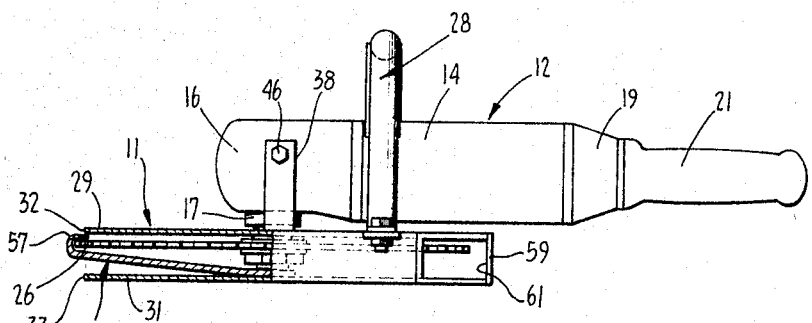
Fig. 2
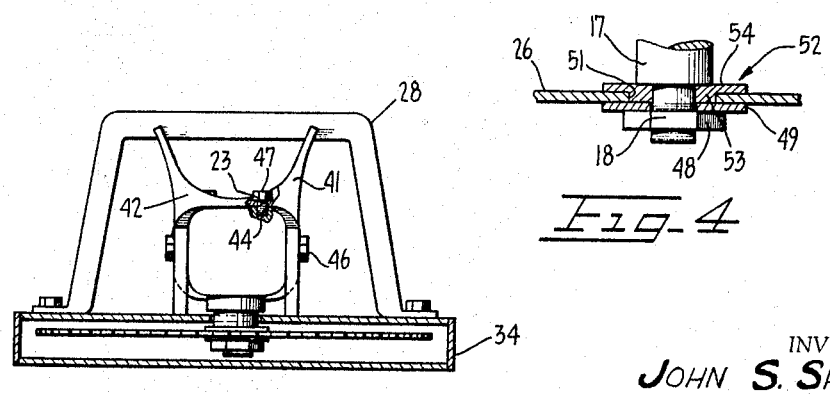
Fig. 3
Fig. 4
INVENTOR.
JOHN S. SPRAGUE
BY
Gardner & Zimmerman
ATTORNEYS

United States Patent Office 3,282,308
Patented Nov. 1, 1966

3,282,308
STUD CUTTING ADAPTER
John S. Sprague, San Leandro, Calif.
(Rte. 1, Box 334, Oroville, Calif.)
Filed Nov. 3, 1964, Ser. No. 408,622
7 Claims. (Cl. 143—43)

The present invention relates to a saw device for cutting through studs in one pass, and is more particularly directed to an adapter for converting a rotary power tool such as a sander-grinder to use for this purpose in a readily manipulable highly expeditious manner.

In the termite control business, and elsewhere, it is necessary to cut through studs in order to facilitate removal and replacement of damaged ones thereof. Frequently, the stud cutting operation must be accomplished within the confines of a crawl-through area, or the like, beneath a house, and accordingly the power saws or other stud cutting apparatus that are used for this purpose must be highly portable and readily manipulable. However, conventional rotary skilsaws of a size and weight suited to the foregoing application are limited in their depth of cut to an amount less than that necessary to cut completely through a 4" x 4" stud in one pass. The size and weight of a conventional rotary saw having a sufficient depth of cut to accommodate a 4" x 4" stud are such that the saw cannot be readily handled and/or cannot be operatively positioned against a stud where space is limited. Accordingly, it is the usual practice to utilize a relatively small rotary blade "Skilsaw" to cut in one pass partially through a stud to the limited depth of cut of the saw. A second pass from the opposite side of the stud is usually not possible since an outer wall secured to the stud obstructs the maneuvering of the saw into the necessary position. Completion of the cut through the stud is consequently usually accomplished by means of a power reciprocating saw, which although it can be positioned to complete the cut, is much slower in its cutting action than a rotary saw. It will be therefore appreciated that the amount of time entailed in cutting through a stud by the combined use of rotary and reciprocating saws is considerably longer than that required to cut through the stud in a single pass of a rotary saw. Material reductions in the man-hour requirements of termite control jobs, and the like, would thus be realized by the provision of a relatively small, light weight, rotary saw device capable of cutting through studs having cross sections of the order of 4" x 4" in a single pass.

It is therefore an object of the present invention to provide a rotary saw device for cutting through a stud in a single pass which is yet of a size and weight comparable to those of a conventional rotary "Skilsaw" capable of cutting through only about half of the stud in one pass.

Another object of the invention is to provide a stud cutting adapter by which a conventional rotary power tool such as a rotary grinder-sander may be readily adapted to single pass stud cutting service.

It is still another object of the invention to provide an adapter of the class described by which a relatively small, light weight grinder-sander may be converted to a rotary saw having a depth of cut greater than the largest transverse dimension of a conventional size stud.

Yet another object of the invention is the provision of an adapter of the class described which may be readily secured to or removed from a grinder-sander to facilitate interchangeable use thereof in stud cutting, as well as the intended grinding and sanding operations, which are also frequently required in termite control applications.

It is a further object of the invention to provide an adapter of the class described wherein the feed is radially of the rotary blade, rather than tangentially thereof, as in the case of a conventional rotary saw.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is a plan view of a stud cutting adapter in accordance with the present invention illustrated in operative association with a conventional power rotary sander-grinder and in position to cut through a stud in a single pass.

FIGURE 2 is a side elevation view of the adapter.

FIGURE 3 is a front end view of the adapter.

FIGURE 4 is an enlarged fragmentary detail view partially in section of a fastener arrangement for securing the saw blade of the adapter to the drive shaft of the sander-grinder.

Referring now to the drawing, there will be seen to be provided a stud cutting adapter 11 which, as illustrated, is operatively associated with a conventional rotary sander-grinder 12 to provide a device which is capable of cutting through a conventional size stud 13, such as a 4" x 4", in a single pass. It will be appreciated that the adapter 11 may be utilized with various rotary power tools, other than the sander-grinder 12; however, a sander-grinder is particularly advantageous in termite control work since sanding and grinding operations are frequently required in addition to the stud cutting operation. Thus, only the single tool and the adapter are required to accomplish all three opertaions. In particular, a Milwaukee Electric Tool Corporation 9" Sander-Grinder, Catalogue 6060, Model No. U–199, has been found to be well suited to the foregoing purpose.

Considering first the rotary power tool 12 in detail, it is to be noted that same is of a type which includes an elongated body 14 having a substantially rectangular cross-section with rounded edges. The body is tapered slightly at one end to terminate in a rounded head 16 from the underside of which a rotary drive shaft 17 depends. The shaft has an inwardly stepped externally threaded reduced end portion 18 which in the normal operation of the tool facilitates the interchangeable securance of sanding and grinding discs thereto. The shaft is rotated by means of an electric motor and suitable gearing (not shown) housed within the body 14. It is of importance to note that the shaft 17 is relatively closely inwardly spaced from the leading end of the head 16. The opposite end of the body 14 is tapered at 19 to terminate in a longitudinally projecting hand grip 21. The opposite sides of the head 16 are provided with taps 22 which normally facilitate threaded attachment of additional grips (not shown) as desired. Similarly, the upper surface of the body rearwardly of the head 16 is provided with taps 23 which normally facilitate threaded attachment of an optional support handle (not shown).

With the sander-grinder 12, or equivalent rotary power tool, thus provided, the stud cutting adapter 11 includes a substantially circular partially peripherally open housing 24 having means at its upper surface for removable attachment to the body of the sander-grinder 12, preferably at the taps 22, 23 thereof in a manner subsequently described. The housing is arranged to permit the drive shaft 17 to depend centrally thereinto. A circular saw blade 26 may be removably secured to the threaded end portion 18 of the drive shaft and when the housing is operatively attached to the power tool, the blade is concentrically disposed within the housing 24. The housing is provided with a substantially rectangular radial guideway 27 extending inwardly from the housing periphery and preferably aligned with the power tool body 14. The width of the guideway, and the depth of the guideway to the leading end of the head 16 of the power tool, are such as to accommodate the stud 13. The guideway thus receives the stud as the adapter is advanced in the direction thereof and the blade 26 rips therethrough. When the stud is fully inserted in the guideway, the blade has cut completely through the stud, and thus the stud cutting operation is accomplished in a single pass. To assist in maneuvering the adapter in the cutting of studs, the adapter is preferably provided with a handle 28 which, in conjunction with grip 21 of the power tool 12, facilitates guidance of the adapter at substantially any position within arm's reach.

Considering now the adapter 11 in greater detail as to preferred structure, it is to be noted that the housing 24 is best formed by coaxially spaced parallel circular plates 29, 31 having straight edge portions 32, 33 extending along short chords thereof. The plates are secured by an annular peripheral wall 34 extending therebetween to the opposite end of the straight edge portions 32, 33. The guideway 27 is then defined by aligned notches 36 respectively extending radially into the plates 29, 31 from the straight edge portions 32, 33 thereof. The outer portions of the notches 36 are defined by parallel uniformly spaced side edges so as to be rectangular and these outer rectangular portions extend to positions just short of the centers of the plates. The inner portions of the notches are inwardly tapered to positions on the opposite sides of the plate centers whereat the notches are terminated in inner edges right-angularly related to the uniformly spaced side edges defining the outer portions of the notches.

To facilitate attachment of the power tool 12 to the adapter 11, a pair of parallel spaced upstanding ears 38 are provided on the exterior of the plate 29 on opposite sides of the tapered inner portion of the notch 36 substantially in alignment with a diameter of the plate perpendicular to the radial center line of the notch. In addition, the handle member 28 is of a U-shaped configuration and mounted upon the exterior of the plate 29 on the opposite side of the center thereof from the notch 36. A spider 41 depends from the web of the handle member and is provided with a lower concave portion 42 conformed to the contour of the power tool body 14. The ears 38 and the handle member 28 are appropriately positioned such that when the shaft 17 of the tool 12 extends through the inner portion of the notch 36 coaxially of the plate 29, and the body is disposed in aligned position to the notch, the ears are disposed adjacent the taps 22 in the sides of the head 16 of the tool, and the concave portion 42 engages the body at a position adjacent the taps 23 in the top of the body. The ears 38 are provided with bores 43 adapted to register with the taps 22 while the concave portion 42 is provided with bores 44 adapted to register with taps 23. Bolts 46, 47 respectively extending through the bores 43, 44 and threadably engaging the taps 22, 23, thus serve to secure the machine tool 12 to the adapter 11 with the drive shaft 17 extending centrally into the housing 24 to support and rotate the saw blade 26 therein.

With regard to the attachment of the saw blade 26 to the drive shaft 17, in circumstances where the central aperture of the blade is of a diameter substantially equal to that of the reduced end portion 18, the latter is merely inserted through the blade aperture and a nut 48 secured thereto with a washer 49 interposed between the nut and blade. However, in some instances a blade aperture 51 is substantially larger than the reduced portion of the shaft, as depicted in FIGURE 4. In such circumstances an adapter collar 52 is provided to facilitate attachment of the blade to the shaft. The collar has an inner bore conformed to the reduced portion of the shaft and includes a cylindrical body 53 having an outwardly flared annular flange 54 at one end. The periphery of the body is conformed to the oversized blade aperture, i.e., the external diameter of the body is substantially equal to the diameter of the aperture while the length of the body longitudinally from the flange is substantially equal to the thickness of the blade. Thus, the collar may be disposed with its body engaging the blade aperture and the reduced end portion of the shaft traversing the collar bore with the flange 54 engaging the shoulder between the reduced and enlarged portions of the shaft. The washer 49 and nut 48 may then be applied to the reduced shaft portion on the opposite side of the blade to firmly secure same to the shaft.

With the adapter 11 provided as described hereinbefore, it will be apreciated that when it is desired to cut through studs, or the like, the blade 26 is first secured to the drive shaft 17 of the power tool 12, in the manner previously noted. The blade is then inserted between the plates 29, 31 of the housing 24 with the shaft in the notch 36, and the tool is moved radially inward relative to the housing into position with the shaft centrally thereof and the body 14 extending oppositely from the notch. The bolts 46, 47 are then inserted through the apertures 43, 44 in ears 38 and spider 41 and threaded into taps 22, 23 to firmly secure the adapter to the tool. The resulting stud cutting device may be guided by means of the grip 21 and handle 28 into operative cutting relation to the stud 13. In this regard the guideway 27 serves to receive the stud as the device is moved transversely therethrough with the rotary blade cutting same in a single pass. In this regard, it is against to be noted that the depth of the guideway 27 to the leading end of the head 16 is greater than the largest transverse dimension of the stud.

Subsequent to completion of stud cutting operations, the bolts 47 may be removed to free the tool 12 from the adapter. The tool may then be employed in the conventional manner to accomplish its intended functions. For example, where the tool is a sander-grinder, it may be employed for sanding and grinding, upon screwing grips into the taps 22 and securing a sanding or grinding disc to the drive shaft 17.

In order to insure optimum safety in the use of the stud cutting device it may be desirable to incorporate a blade guard in the adapter 11 to protectively cover the portions of the blade which extend outwardly beyond the straight portions 32, 33 of the housing 24, except when the device is operatively positioned to cut through a stud. In this regard, a sector shaped guard plate 56 is advantageously pivotally secured at its apex end to the lower housing plate 31 in concentric relation to the shaft 17. The arcuate end of the guard plate is provided with an inwardly turned lip 57 adapted to encompass the toothed periphery of the blade 26. A finger 58 projects radially outward from one end of the lip 57 and is engageable with the peripheral wall 34 of the housing at one end of the straight edge portions 32, 33. In addition, the guard plate is spring loaded, as by means of a spring (not shown), in the direction of such end of the straight edge portions to normally engage the finger 58 with the wall 34 and resiliently retain the guard plate in a position such that the lip 57 covers the portions of the blade extending outwardly beyond the straight edge portions of the housing. In order to cut a stud, it is then only necessary to engage the finger 58 with the stud and pivot the adapter in opposition to the spring loading of the guard plate. The guard plate is thereby pivoted away from the straight edge portions 32, 33 to expose the blade at the entrance of the guideway 27 and permit reception of the stud as the blade cuts therethrough.

As a further advantageous feature which may be incorporated in the adapter 11, means may be provided to facilitate the ready exhaust of sawdust from the interior of housing 24. To this end, the housing is preferably formed with a tangential projection 59 defining a sawdust exhaust passage 61 communicating with the housing interior. Such projection is best provided at a point of the housing opposite to the guideway 27 with the passage 61 being directed laterally of the axis of the guideway. Accordingly, as the stud cutting device is employed to cut through a stud, the sawdust generated by the cutting action is discharged from the exhaust passage 61 laterally of the direction of advance of the adapter.

What is claimed is:

1. A stud cutting device comprising a substantially circular housing having a substantially rectangular guideway extending radially thereinto to a position beyond the axis thereof, a pair of upstanding ears projecting from said housing on opposite sides of said guideway adjacent the aixs of said housing, said ears having bores through their free ends, a substantially U-shaped handle secured to said housing in alignment with said guideway and on the opposite side of said housing therefrom, said handle having a spider depending from the web thereof, said spider having bores therethrough, a rotary power tool including an elongated body having a head with a rotary drive shaft depending therefrom, said head having taps in the sides thereof, said body having taps in the top thereof rearwardly of said head, said tool disposed with said body aligned with and oppositely directed from said guideway and said drive shaft extending coaxially into said housing, said taps in the sides of said head aligned with said bores of said ears, said taps in the top of said body aligned with said bores of said spider, bolts extending through said bores and threading said taps, and a circular saw blade coaxially disposed in said housing and secured to said shaft.

2. A device according to claim 1, further defined by said shaft having an inwardly stepped reduced externally threaded end portion, said blade having a central bore of greater diameter than said end portion, a cylindrical collar having a coaxial bore of substantially the diameter of said end portion, said collar having a body portion with an outwardly flared annular flange at one end, said body portion having an external diameter substantially equal that of said blade bore and a length from said flange to the opposite end of the body portion substantially equal to the thickness of said blade, said collar coaxially disposed upon said end portion of said shaft with said flange engaging a face of said blade and the shoulder between said reduced end portion and the relatively enlarged portion of said shaft, said body portion of said collar extending coaxially through said blade bore, a washer coaxially disposed on the reduced end portion of said shaft and engaging the opposite face of said blade from that engaged by said flange of said collar, and a nut threadably engaging said reduced end portion of said shaft and bearing against said washer.

3. A stud cutting device comprising a pair of parallel spaced coaxial circular plates having straight edge portions extending along short chords thereof, an annular peripheral wall extending between said plates to opposite ends of said straight edge portions, said plates having aligned notches extending radially thereinto from said straight edge portions, said notches having outer rectangular portions extending to positions closely spaced from the axis of said plates and merging into tapered inner portions extending to the opposite side of the axis of said plates, a pair of upstanding ears projecting from a first of said plates on opposite sides of the inner portion of the notch thereof, said ears having bores through their free ends, a substantially U-shaped handle secured to said first plate in alignment with said notch thereof on the opposite of said plate therefrom, said handle having a spider depending from the web thereof, said spider having bores therethrough, a power rotary sander-grinder including an elongated body having a head at one end with a rotary drive shaft depending therefrom, said body having a substantially rectangular cross section with round edges, said body tapered at the opposite end thereof from said head and terminating in a hand grip, said head having taps in the sides thereof, said body having taps in the top thereof rearwardly of said head, said body aligned with and oppositely directed from said notches with said drive shaft extending coaxially through the inner portion of said notch of said first plate, said taps in the sides of said head aligned with said bores of said ears, said taps in the top of said body aligned with said bores of said spider, bolts extending through said bores and threading said taps, and a circular saw blade coaxially disposed in said housing and secured to said shaft.

4. A stud cutting adapter comprising a substantially circular housing having a substantially rectangular guideway extending radially thereinto beyod the axis thereof, a pair of upstanding ears projecting from said housing on opposite sides of said guideway adjacent the axis of said housing, said ears having bores therethrough adapted to register with taps in the sides of a head of a rotary power tool body, and a substantially U-shaped handle secured to said housing in alignment with said guideway on the opposite side of the housing therefrom, said handle having a spider depending from the web thereof adapted to engage said power tool body, said spider having bores therethrough adapted to register with taps in the top of said power tool body.

5. A stud cutting adapter according to claim 4, further defined by blade guard means carried by said housing and movable from a normal position in said guideway to a position in unobstructing relation thereo.

6. A stud cutting adapter according to claim 4, further defined by a sector shaped guard plate pivotally mounted at its apex end in said housing coaxially thereof, said guard plate having an inwardly turned lip at its arcuate peripheral end with a finger projecting radially therefrom, said guard plate spring loaded to normally engage said finger with a portion of said housing adjacent one side of said guideway and position said guard plate therein.

7. A stud cutting adapter according to claim 4, further defined by said housing having a tangential projection defining a sawdust exhaust passage communicating with the housing interior, said project extending from a point of said housing opposite said guideway and directed laterally of the axis of said guideway.

References Cited by the Examiner

UNITED STATES PATENTS

| | | | |
|---|---|---|---|
| 2,274,421 | 2/1942 | Lindstrom et al. | 30—167 |
| 2,342,052 | 2/1944 | Jimmerson et al. | |
| 2,662,562 | 12/1953 | Lindell | 30—167 X |
| 2,713,717 | 7/1955 | Smithey | 30—167 |
| 2,854,042 | 9/1958 | Robinson | 30—155 |
| 2,912,021 | 11/1959 | Gommel | 143—155 |

WILLIAM FELDMAN, *Primary Examiner.*

R. V. PARKER, JR., *Assistant Examiner.*